(12) United States Patent
Carlson et al.

(10) Patent No.: US 10,221,678 B2
(45) Date of Patent: Mar. 5, 2019

(54) APPARATUS AND METHOD FOR MEASURING A PIPE WITHIN AN OIL WELL STRUCTURE

(71) Applicant: Intelligent Wellhead Systems Inc., Red Deer (CA)

(72) Inventors: Aaron Mitchell Carlson, Lake Country (CA); Bradley Robert Martin, Red Deer (CA)

(73) Assignee: Intelligent Wellhead Systems Inc., Red Deer (CA)

(*) Notice: Subject to any disclaimer, the term of this patent is extended or adjusted under 35 U.S.C. 154(b) by 89 days.

(21) Appl. No.: 15/169,500

(22) Filed: May 31, 2016

(65) Prior Publication Data

US 2016/0312602 A1   Oct. 27, 2016

Related U.S. Application Data

(63) Continuation-in-part of application No. 14/423,090, filed as application No. PCT/CA2013/050658 on Aug. 23, 2013, which is a continuation-in-part of application No. 13/593,493, filed on Aug. 23, 2012, now Pat. No. 9,097,813.

(51) Int. Cl.
*E21B 47/08* (2012.01)
*E21B 33/06* (2006.01)
*G01B 7/12* (2006.01)
*E21B 47/09* (2012.01)

(52) U.S. Cl.
CPC ........ *E21B 47/082* (2013.01); *E21B 47/0905* (2013.01); *G01B 7/12* (2013.01)

(58) Field of Classification Search
CPC .... E21B 47/082; E21B 47/0905; E21B 17/04; E21B 33/061; G01B 7/12; G01V 3/08
See application file for complete search history.

(56) References Cited

U.S. PATENT DOCUMENTS

| | | | |
|---|---|---|---|
| 2,897,440 | A | 4/1955 | Hawthorne |
| 3,597,678 | A * | 8/1971 | Fearon ............... G01B 7/10 |
| | | | 324/220 |
| 4,089,532 | A | 5/1978 | Kamyshnikov et al. |
| 4,332,367 | A | 5/1982 | Nelson |
| 4,629,991 | A | 12/1986 | Wheeler |
| 4,647,002 | A | 3/1987 | Crutchfield |
| 4,703,938 | A | 11/1987 | Fox |

(Continued)

*Primary Examiner* — Huy Q Phan
*Assistant Examiner* — Zannatul Ferdous
(74) *Attorney, Agent, or Firm* — Osha Liang LLP

(57) ABSTRACT

An apparatus for measuring a pipe within a well structure comprises a tubular body extending between first and second ends and having an inner surface defining a passage therethrough and an outer surface formed of a non-magnetic alloy metal. The apparatus further comprises a pair of flanges each connected to one of the first or second ends of the tubular body having a passage therethrough corresponding to the passage of the tubular body, each of the pair of flanges being connectable inline with the well structure. The apparatus further comprises at least one sensor stack being locatable around an outside of the tubular body comprising a sensor adapted to measure magnetic field strength and at least one magnetic stack being locatable around the outside of the tubular body comprising at least one magnet.

19 Claims, 9 Drawing Sheets

(56) References Cited

U.S. PATENT DOCUMENTS

| | | |
|---|---|---|
| 4,710,712 A | 12/1987 | Bradfield et al. |
| 4,964,462 A | 10/1990 | Smith |
| 5,014,781 A | 5/1991 | Smith |
| 5,320,325 A | 6/1994 | Young et al. |
| 5,321,990 A | 6/1994 | Lang et al. |
| 5,666,050 A | 9/1997 | Bouldin et al. |
| 5,750,896 A | 5/1998 | Morgan et al. |
| 6,032,739 A | 3/2000 | Newman |
| 6,253,842 B1 | 7/2001 | Connell et al. |
| 6,478,087 B2 | 11/2002 | Allen |
| 6,720,764 B2 | 4/2004 | Relton et al. |
| 6,768,299 B2 | 7/2004 | Almaguer |
| 6,896,056 B2 | 5/2005 | Mendez et al. |
| 7,274,989 B2 | 9/2007 | Hopper |
| 7,347,261 B2 | 3/2008 | Markel et al. |
| 7,410,003 B2 | 8/2008 | Ravensbergen et al. |
| 7,449,879 B2 * | 11/2008 | Biester ................ E21B 47/0905 324/207.17 |
| 7,832,706 B2 | 11/2010 | Judge |
| 7,980,305 B2 | 7/2011 | Judge et al. |
| 2003/0052670 A1 | 3/2003 | Miszewski |
| 2004/0041560 A1 | 3/2004 | Walters et al. |
| 2004/0124837 A1 * | 7/2004 | Prammer ............. G01N 24/081 324/303 |
| 2005/0055163 A1 | 3/2005 | Hopper |
| 2005/0115708 A1 * | 6/2005 | Jabusch ................ E21B 47/122 166/250.15 |
| 2007/0017705 A1 * | 1/2007 | Lasater ................. E21B 47/024 175/40 |
| 2009/0128141 A1 * | 5/2009 | Hopmann ........... E21B 47/0905 324/207.24 |
| 2009/0132181 A1 | 5/2009 | Girndt |
| 2011/0057647 A1 | 3/2011 | Biester et al. |
| 2013/0333872 A1 * | 12/2013 | McMillon ............... E21B 23/00 166/66.5 |
| 2014/0238540 A1 * | 8/2014 | Cook ....................... B65B 3/18 141/94 |

\* cited by examiner

APPARATUS AND METHOD FOR MEASURING A PIPE WITHIN AN OIL WELL STRUCTURE

BACKGROUND OF THE INVENTION

1. Field of Invention

The present invention relates to well boring in general and in particular to a method and apparatus for measuring a pipe within a well structure.

2. Description of Related Art

In hydrocarbon production, a well may be formed by an outer casing located within a wellbore and may optionally be surrounded by cement. The well may then include a tool or production string therein for working or producing from the well. Due to the potentially high pressures within the well from hydrocarbons extracted from the hydrocarbon producing formation, numerous types of shut-off valves, spools and other fittings to isolate and control access to the well, such as, by way of non-limiting example a blow out preventer (BOP) stock, as it is commonly known or a snubbing unit.

The well structure may include shut-off valves for closing off or otherwise completely or partially sealing the top of the well as desired by a user. In particular, one common design for such valves are pipe rams which utilize a pair of opposed rams which are movable along a plane perpendicular to the well bore. The rams may be moved along the plate by pistons or the like and are operable to be moved out of the central passage of the well or to be pressed together to seal the well. Rams may be of a blind or shear type to completely seal the well or of a pipe ram type in which the two rams each include a half-circle hole sized to pass a pipe therethrough when the two rams are pressed together. Such pipe rams are commonly utilized in snubbing units to seal around the drill or production string and isolate the well below the pipe ram from the environment while permitting the drill or production string to remain within the well or to be extracted or inserted into the well.

One difficulty that exists with common hydrocarbon wells is the difficulty of determining the location of the connections on the tool or production string. Such strings are commonly formed of a plurality of endwise connected pipes which are connected to each other by threaded connectors. Conventionally such threaded connectors are located at each end and provide enlarged portions of the pipe which are strengthened so as to provide a larger stronger section of the pipe to be grasped by tools and the like. Such tool joints present a larger cross-section than the remainder of the pipe. Disadvantageously, such enlarged diameters of tool joints may interfere with the proper operation of pipe rams should the pipe ram be attempted to be closed at the location of such a tool joint or when extracting or inserting the pipe when at least one of the rams is set to hold back the pressure. Such an event is commonly referred to as stripping which may create a risk of the tool joint being pulled or pushed into the closed pipe ram thereby damaging the pipe and/or pipe ram.

SUMMARY OF THE INVENTION

According to a first embodiment of the present invention there is disclosed an apparatus for measuring a pipe within a well structure. The apparatus comprises a tubular body extending between first and second ends and having an inner surface defining a passage therethrough and an outer surface formed of a non-magnetic alloy metal. The apparatus further comprises a pair of flanges each connected to one of the first or second ends of the tubular body having a passage therethrough corresponding to the passage of the tubular body, each of the pair of flanges being connectable inline with the well structure. The apparatus further comprises at least one sensor stack being locatable around an outside of the tubular body comprising a sensor adapted to measure magnetic field strength and at least one magnetic stack being locatable around the outside of the tubular body comprising at least one magnet.

The tubular body may include at least one housing each extending around one of the at least one sensor stack or one of the at least one magnetic stack. Each housing may comprise a sleeve. The sleeves may be formed of a ferrous metal alloy. Each of said at least one sensor stack and said at least one magnetic stacks may extend radially from said tubular body.

The sensor stack may comprise a sensor output a signal representing the diameter of the metallic object located within the central bore. The sensor may comprise a hall effects sensor. The sensor may be located at proximate to an outer surface of the tubular body. The sensor stack may include a magnet located at an end of the blind bore opposite to the sensor.

The magnet stack may comprise at least one magnet. The magnet may comprise a plurality of magnets. The magnet may comprises rare earth magnets. The magnet may comprises electromagnets.

The sensor stack and magnetic stack may be are arranged around the tubular body. The sensor stack and magnetic stack may be arranged at regular intervals around the tubular body. The sensor stack and magnetic stack may be arranged along a common plane perpendicular to an axis of the tubular body. The sensor stack and magnetic stack may be arranged along a plurality of planes.

According to a further embodiment of the present invention there is disclosed a system for measuring a pipe within a well structure comprising a tubular body extending between first and second ends and having an inner surface defining a passage therethrough and an outer surface, the body being formed of a non-magnetic alloy metal. The system further comprise a pair of flanges each connected to one of the first or second ends of the tubular body having a passage therethrough corresponding to the passage of the tubular body, each of the pair of flanges being connectable inline with the well structure. The system further comprise at least one sensor stack being locatable around an outside of the tubular body comprising a sensor adapted to measure magnetic field strength, at least one magnetic stack being locatable around the outside of the tubular body comprising at least one magnet and a display adapted to receive an output from the at least one sensor stack and provide a display to a user indicating the diameter of an object within the tubular body.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention wherein similar characters of reference denote corresponding parts in each view.

DETAILED DESCRIPTION

Figure 1:
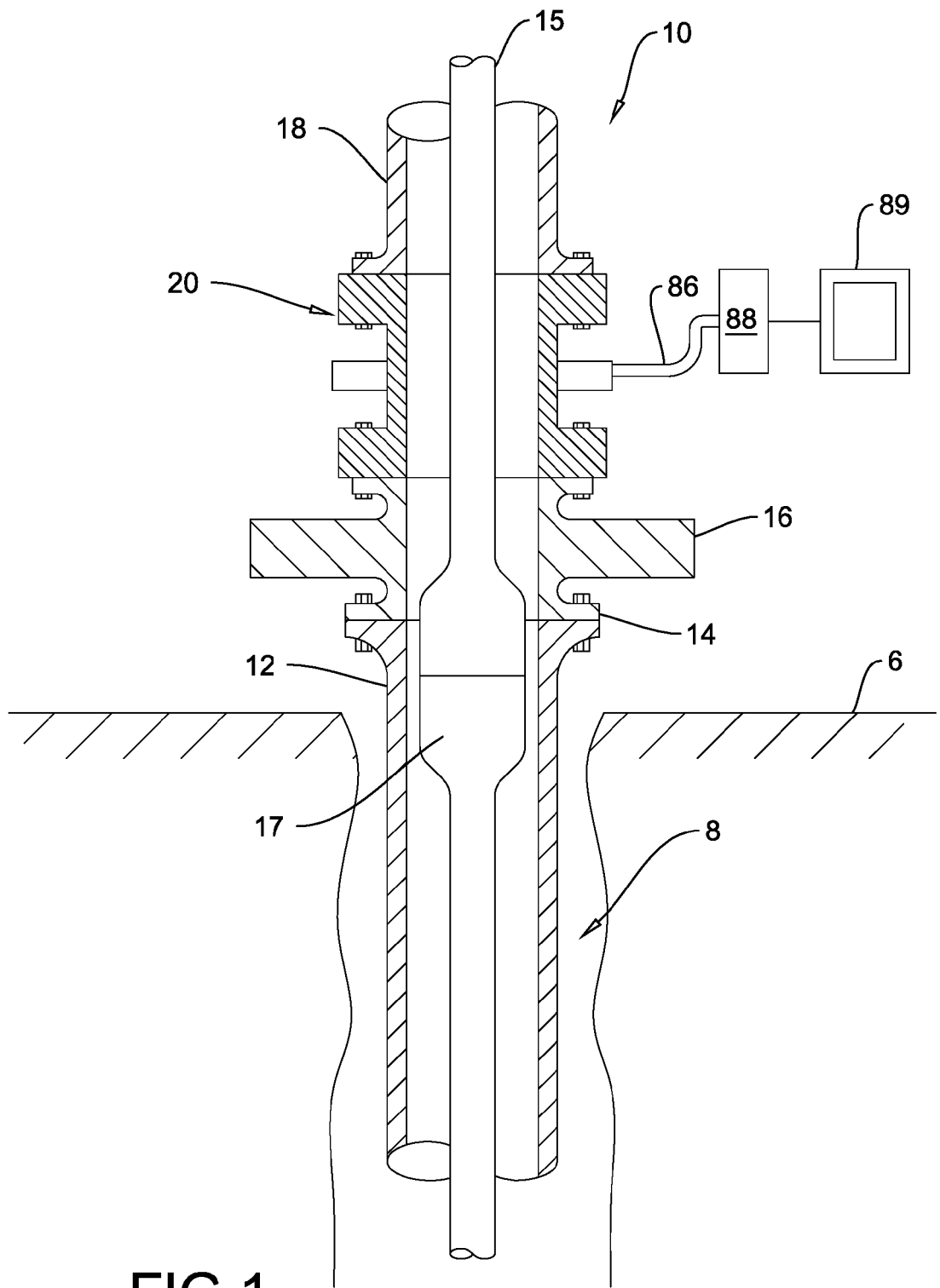
FIG. 1 is a cross-sectional view of the top end of a wellbore having an outer casing and a production string located therein with an apparatus for sensing the location of a pipe joint.

Referring to FIG. 1, a well assembly located within a well bore 8 of a soil formation 6 is illustrated generally at 10. The well assembly includes a well casing 12 having top flange 14 which is securable to a pipe ram 16 or any other desired well head device. It will be appreciated that the present apparatus may be located at any location within the well, such as, by way of non-limiting example, the riser, snubbing stack, blow out preventer or any other well apparatus. It will also be appreciated that although only a single pipe ram is illustrated in FIG. 1 for the sake of clarity, it will be appreciated that many installations will include more than one well head component. As illustrated in FIG. 1, the well assembly includes an apparatus for sensing a pipe joint according to a first embodiment of the invention, shown generally at 20 and one or more top pipe, well component or other equipment 18 located thereabove. A production or tool string 15 is located within the casing and includes a plurality of tool joints 17 therealong.

The apparatus 20 senses the presence of the tool joint 17 and outputs a signal to a computer 88 and/or display 89 so as to indicate to a user that the tool joint 17 located within apparatus 20 so as to permit the user to advance the production or tool string 15 within the casing 12 by a predetermined distance so as to avoid having one of the pipe rams 16 or other well head devices engage upon the tool joint.

Figure 2:
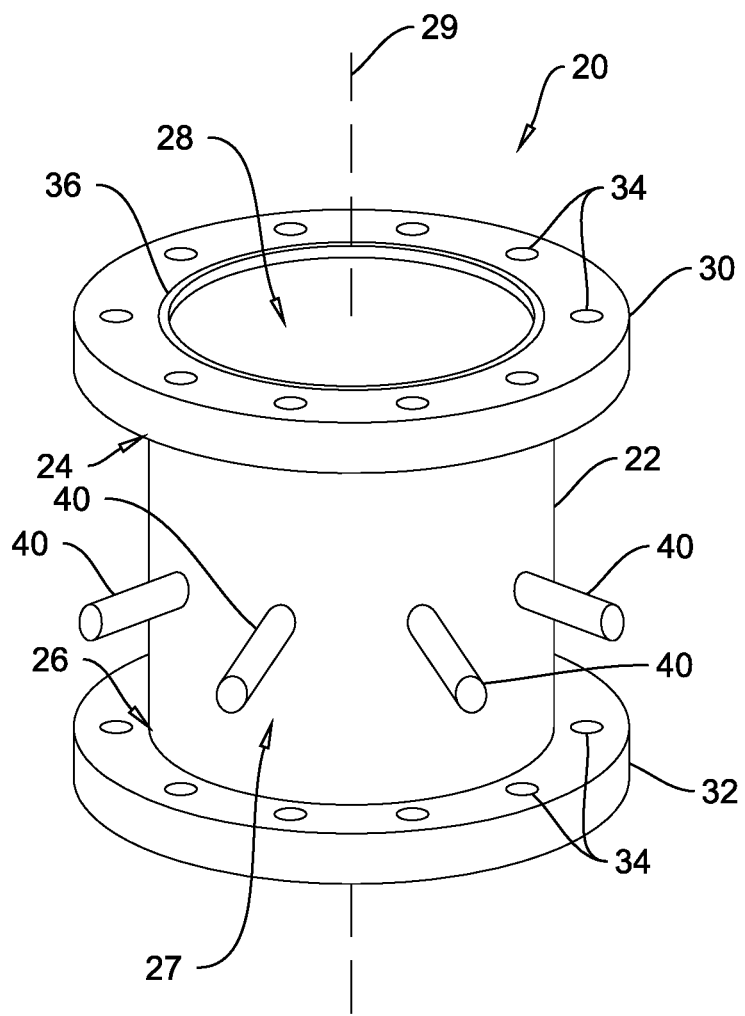
FIG. 2 is a perspective view of the apparatus for sensing the location of a pipe joint according to a first embodiment of the present invention.
Figure 4:
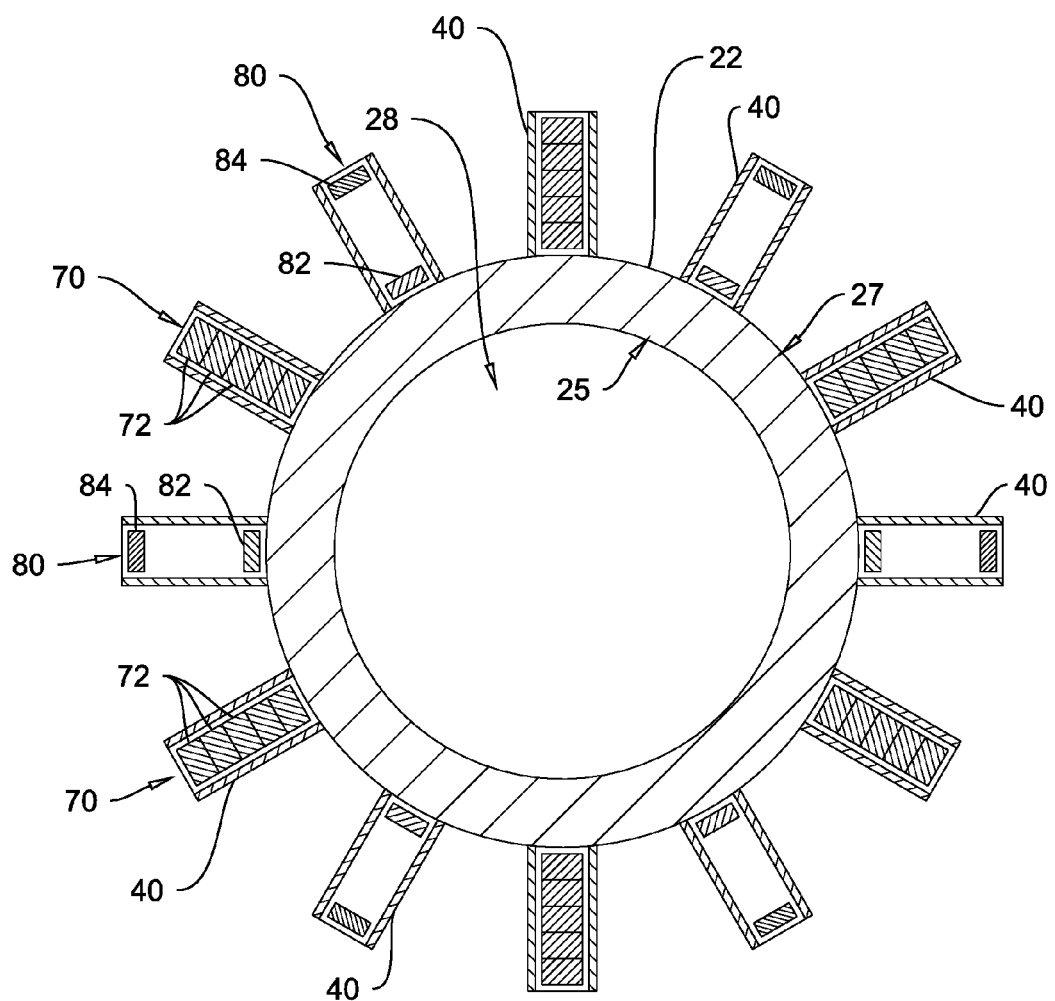
FIG. 4 is a cross-sectional view of the apparatus of FIG. 3 as taken along the line 4-4.

With reference to FIG. 2, the apparatus 20 comprises a tubular member or body 22 extending between top and bottom ends, 24 and 26, respectively and extending between inner and outer surfaces, 25 and 27, respectively. The tubular member 22 includes a plurality of magnetic and sensor stacks, 70 and 80 extending therefrom as will be more fully described below. Optionally each of the sensor and magnetic stacks 70 and 80 may be contained within a housing, such as, by way of non-limiting example, a sleeve 40 extending from the outer surface of the tubular member 22. As illustrated, the inner and outer surfaces 25 and 27 of the tubular member 22 are substantially cylindrical about a central axis 29 and the inner surface 25 defines a central passage 28 extending therethrough which may be sized and shaped to correspond to the interior of the casing 12. As illustrated in FIGS. 2 and 4, the top and bottom surfaces of the top and bottom flanges 30 and 32 are substantially planar along a plane normal to the axis 29 and may optionally include a seal groove 36 extending annularly therearound for receiving a seal as are commonly known in the art.

Figure 6:
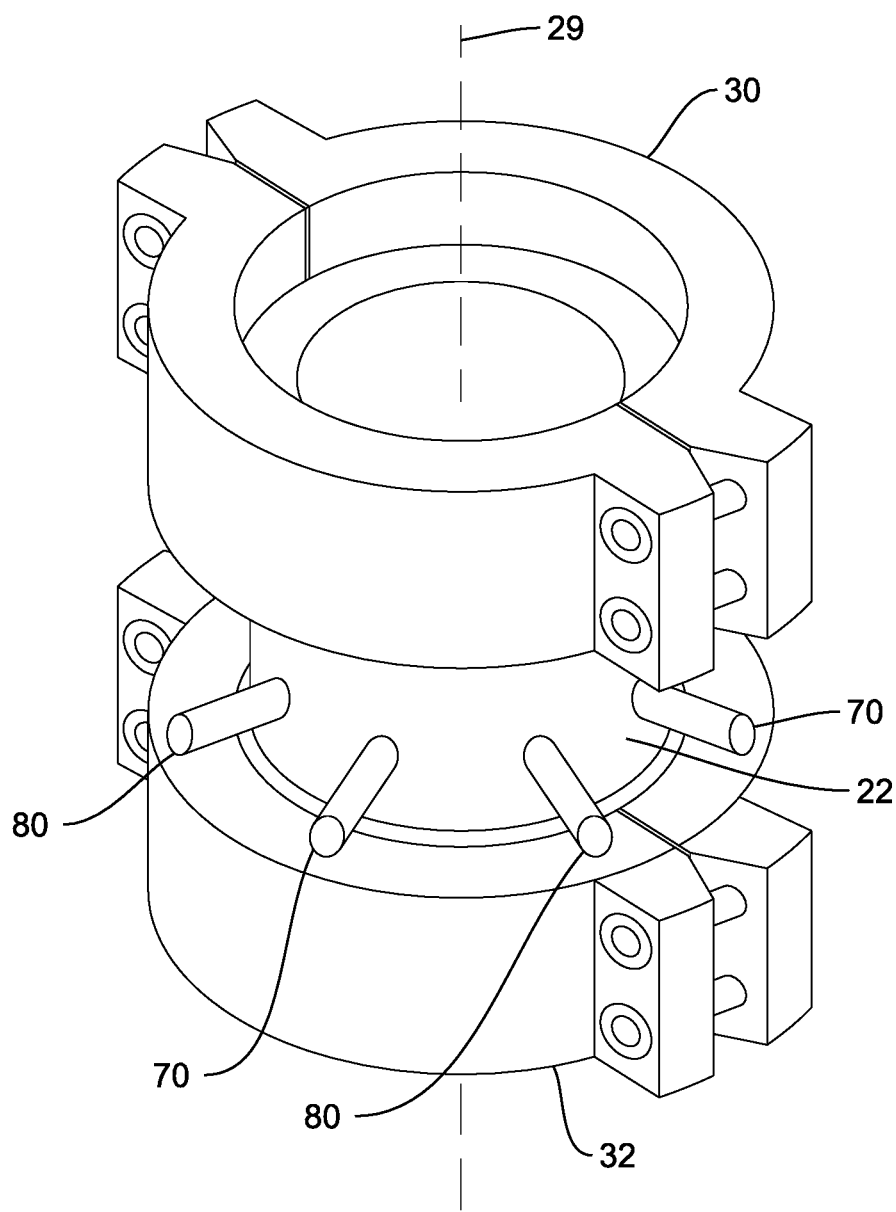
FIG. 6 is perspective view of an apparatus for sensing the location of a pipe joint according to a further embodiment of the present invention.

The apparatus 20 includes top and bottom flanges, 30 and 32, respectively, adjacent to and connected to each of the top and bottom ends 24 and 26 of the tubular member so as to form a continuous body therewith. As illustrated, each of the top and bottom flanges 30 and 32 and the tubular member 22 includes the central passage 28 extending therethrough along a common central axis 29. The top and bottom flanges 30 and 32 are sized to have a larger outer diameter than the tubular member 22 so as to overhang the tubular member and include a plurality of bores 34 therethrough for securing to adjacent structures within the well head, such as, by way of non-limiting example, pipe rams, or the like. Optionally, the apparatus may be formed as a hub clamp wherein the top and bottom flanges 30 and 32 may comprise clamping bodies adapted to clamp adjacent pipes as illustrated in FIG. 6 as are commonly known. In operation, the top and bottom flanges 30 and 32 may be secured to such additional structures through the use of bolts or the like as is commonly known. Optionally, the apparatus may be formed as a hub clamp wherein the top and bottom flanges 30 and 32 may comprise clamping bodies adapted to clamp adjacent pipes as illustrated in FIG. 6 as are commonly known.

Figure 3:
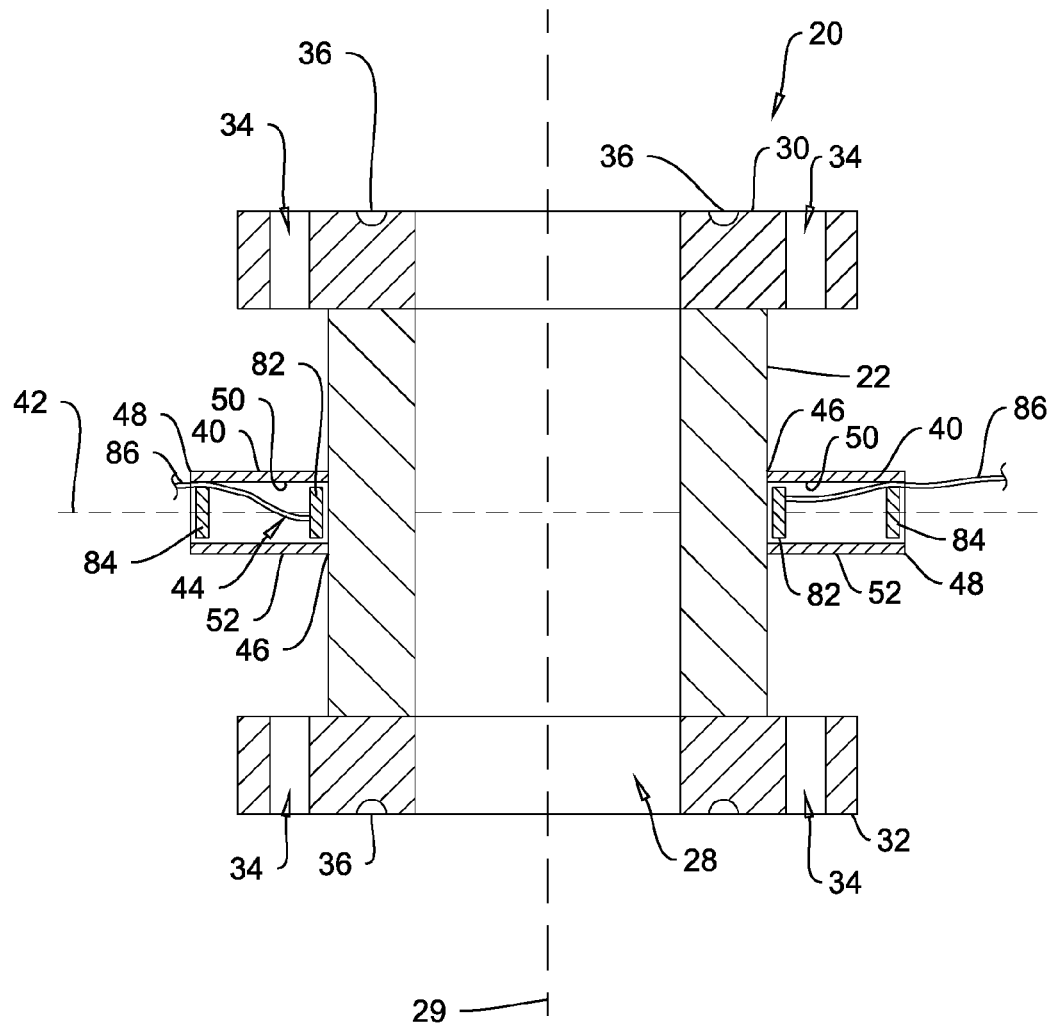
FIG. 3 is a cross-sectional view of the apparatus of FIG. 3 as taken along the line 3-3.
Figure 7:
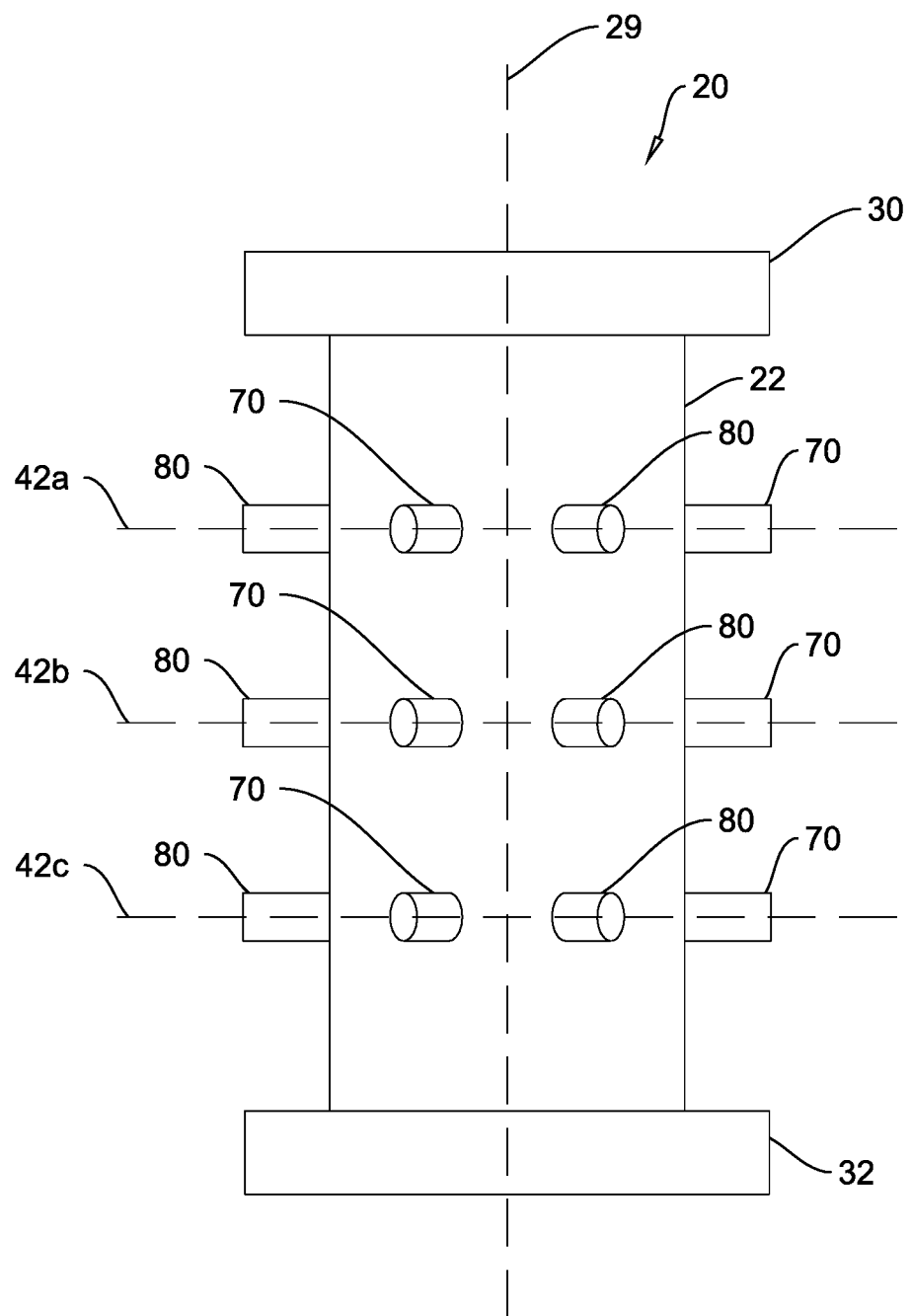
FIG. 7 is a side view an apparatus for sensing the location of a pipe joint according to a further embodiment of the present invention.

As set out above the tubular body 22 may optionally include a plurality of housings adapted to contain and protect the sensor and magnetic stacks 70 and 80 extending radially from the outer surface 27 of the tubular body. As illustrated in FIGS. 2-4, the housings may comprise sleeves extending radially from the tubular body 22. It will be appreciated that the magnetic and sensor stacks 70 and 80 may also extend from the outside surface 27 of the tubular body 22 without such housing or sleeve therearound. As illustrated in FIG. 3, each of the sleeves 40 may be located at a position along the tubular body 22 so as to form a common plane 42 perpendicular to the central axis 29 of the apparatus. As illustrated in FIG. 7, the magnetic and sensor stacks 70 and 80 may also be arranged along more than one plane 42a, 42b and 42c so as to form sensor locations enabling a user to track the progress of a pipe through the apparatus 20.

The sleeves 40 comprise tubular members extending between first and second ends, 46 and 48, respectively, and having inner and outer surfaces, 50 and 52, respectively. The sleeves 40 may be formed of a substantially ferromagnetic material, such as steel so as to conduct magnetic flux as will be more fully described below. The sleeves 40 are selected to have a sufficient inner surface diameter sufficient to accommodate a magnetic stack 70 or a sensor stack 80 therein as more fully described below. By way of non-limiting example it has been found that a diameter of the inner surface of between 0.5 and 6 inches (13 and 152 mm) has been useful. The sleeve 40 may also have a length sufficient to receive the sensor and magnet stacks therein, such as by way of non-limiting example, between 0.5 and 6 inches (13 and 152 mm). Additionally, it will be appreciated that where other housing types are utilized, such housings may be formed of any suitable size to contain and protect the magnetic and sensor stacks from impacts or the like.

Turning now to FIGS. 3 and 4, the sleeves 40 are arranged around the tubular body 22 along a common plane 42. The common plane 42 is perpendicular to the central axis 29 and may be located at any height along the tubular body such as by way of non-limiting example, midpoint therealong as illustrated in FIG. 3. As illustrated in FIG. 4, the sleeves 40 may be arranged around the tubular body 22 at regular intervals. As illustrated herein, sleeves 40 are secured to the outer surface 27 of the tubular body 22 so as to form a blind bore 44 therewith. The sleeves 40 contain therein at least one magnetic stack 70 and at least one sensor stack 80 wherein the magnetic stack 70 forms a magnetic field within the interior of the central passage 28 and the sensor stack 80 measures changes in this magnetic field in response to an object passing therethrough. In particular, the magnetic stacks 70 and sensor stacks 80 may be alternated around the tubular body 22 and it will therefore be appreciated that an even number of sleeves will be required. It will also be appreciated that other arrangements of magnetic and sensor stacks may be useful as well.

The magnetic stack 70 comprises a plurality of magnets sized to be located within the sleeve 40. The magnets 60 are selected to have strong magnetic fields. In particular, it has been found that rare earth magnets, such as, by way of non-limiting example, neodymium, samarium-cobalt or electromagnets. Optionally, the magnets 60 may also be nickel plated or otherwise coated for corrosion resistance.

The sensor stack 80 comprises a sensor 82 adapted to provide an output signal in response to the magnetic field in their proximity. By way of non-limiting example, the sensors 82 may comprise magnetic sensors, such as hall effect sensors although it will be appreciated that other sensor types may be utilized as. In particular it has been found that a hall effects sensor, such as a model SS496A1 sensor manufactured by Honeywell® has been particularly useful although it will be appreciated that other sensors will also be suitable. The sensors 82 are inserted into the sleeves 40 to be proximate to the first end 46 thereof and are retained within the sleeves by any suitable means, such as, by way of non-limiting example, adhesives, threading, fasteners or the like. The sensor 82 includes an output wires 86 extending therefrom as illustrated in FIG. 1. The output wire 86 is wired or otherwise connected to a computer 88 which optionally outputs to a display 89 and is therefore operable to provide an output signal representing the width of a metallic object located within the central passage 28 such as the drill string.

The sensor stack 80 may also optionally include a magnet 84 located at the second end 48 of the sleeve 40. The magnets 84 are selected to have strong magnetic fields. In particular, it has been found that rare earth magnets, such as, by way of non-limiting example, neodymium, samarium-cobalt or electromagnets. Optionally, the magnets 60 may also be nickel plated or otherwise coated for corrosion resistance. The magnets 84 are located at the second ends 48 of the sleeves 40 and retained in place by any suitable means, such as, by way of non-limiting example, adhesives, threading, fasteners or the like.

The apparatus 20 may have any depth between the top and bottom surfaces as is desired by a user. Similarly, the top and bottom flanges 30 and 32 may have a thickness selected to provide sufficient strength to the apparatus so as to maintain the structural integrity of the well. Additionally, the apparatus will be selected to have an inner diameter of the inner surface 25 to correspond to the inner passage of the casing 12 for which it is to be used and an outer surface 27 diameter so as to provide a sufficient strength to maintain the anticipated pressure within the well according to well known means for the pressures and temperatures expected within the well bore. The tubular body 22 may be formed of a non-magnetic material, such as, by way of non-limiting example a nickel-chromium based alloy, such as Inconel® manufactured by Special Metals Corporation. It will also be appreciated that other materials may be useful as well, such as, by way of non-limiting example duplex and super duplex stainless steels provided they do not interfere with the sensor operation as described below. The top and bottom flanges 30 and 32 are formed of a ferrous alloy such as, by way of non-limiting example, 4130 and 4140 steel although other metals such as, by way of non-limiting example, super duplex and stainless steel, may be useful here as well. Optionally, the top and bottom flanges may also be formed of a similar non-magnetic material as the tubular body 22. The flanges 30 and 32 and the tubular body 22 may be connected to each other through any known method such as, by way of non-limiting example, welding or the like so as to form a unitary body.

Figure 5:
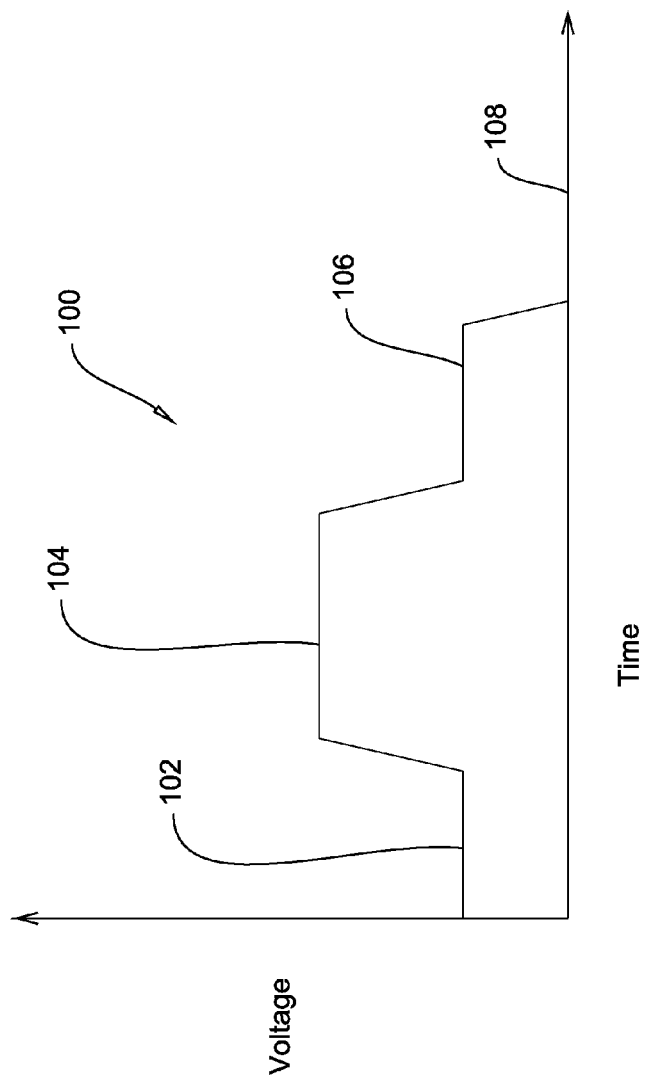
FIG. 5 is an illustration of a display output showing voltage produced by a sensor of the apparatus of FIG. 3 as a tool joint is passed therethrough.

With reference to FIG. 5, the output 100 may display the voltage signal outputted by the one or more sensors against time. During a first time period, the voltage signal will be at a first level, generally indicated at 102, while a main portion of the pipe is drawn through the apparatus 20. As the tool joint 17 is drawn through the apparatus 20, the voltage output of the sensors 82 will be increased, generally indicated at 104, due to the increased diameter of the metallic object within the central passage 28. After the tool joint 17 passes the apparatus, the voltage will return to a lower level 106. In such a manner, the display 100 will indicate to an operator when the tool joint 17 is located within the sleeve. Thereafter, the operator will be able to advance the production or tool string 15 by a known distance so as to ensure that the pipe rams 16 or other equipment avoids the tool joint 17. The system may also optionally display a zero pipe condition generally illustrated at 108 in which the pipe is removed from the well bore.

Figure 8:
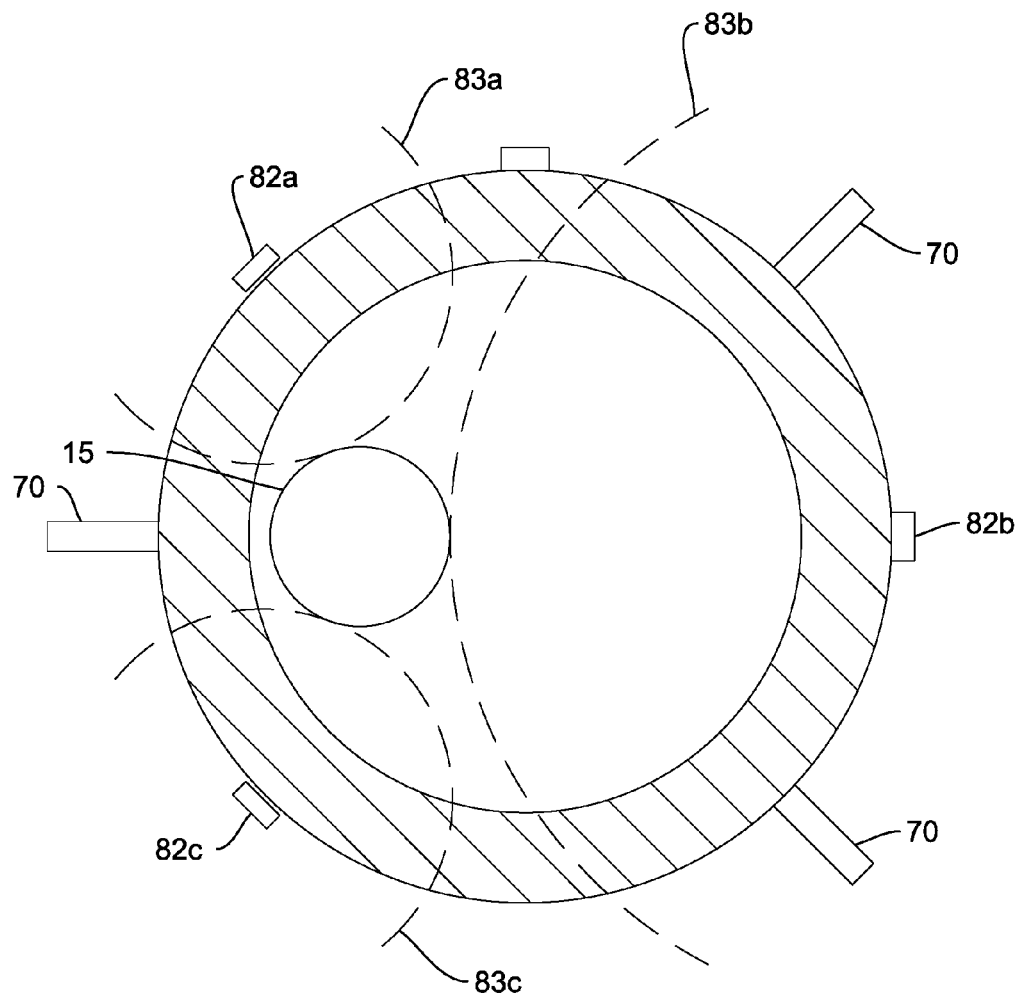
FIG. 8 is a cross-sectional view of the apparatus of FIG. 1 with a pipe therein.

The sensors 82 may be calibrated prior to operation by locating a magnetic body of known size and position within the central passage 28 and adjusting the readout for each sensor 82a, 82b and 8c according to known methods. Thereafter, in operation, each of the sensors 82 measures a distance to the pipe as illustrated generally at 83a, 83b and 83c in FIG. 8 wherein the measured distance from each of the sensors is then compared to each other to estimate the size and position of the tool string 15 or pipe utilizing triangulation according to known methods. As illustrated in FIG. 8, a single set of 3 sensors may be utilized to provide such location. It will be appreciated, that additional sets of 3 or more sensors may also be provided to provide an additional measure of the position of the pipe. Such multiple positions and size of the pipe may then be compared to and averaged with each other to improve accuracy of the system.

Figure 9:
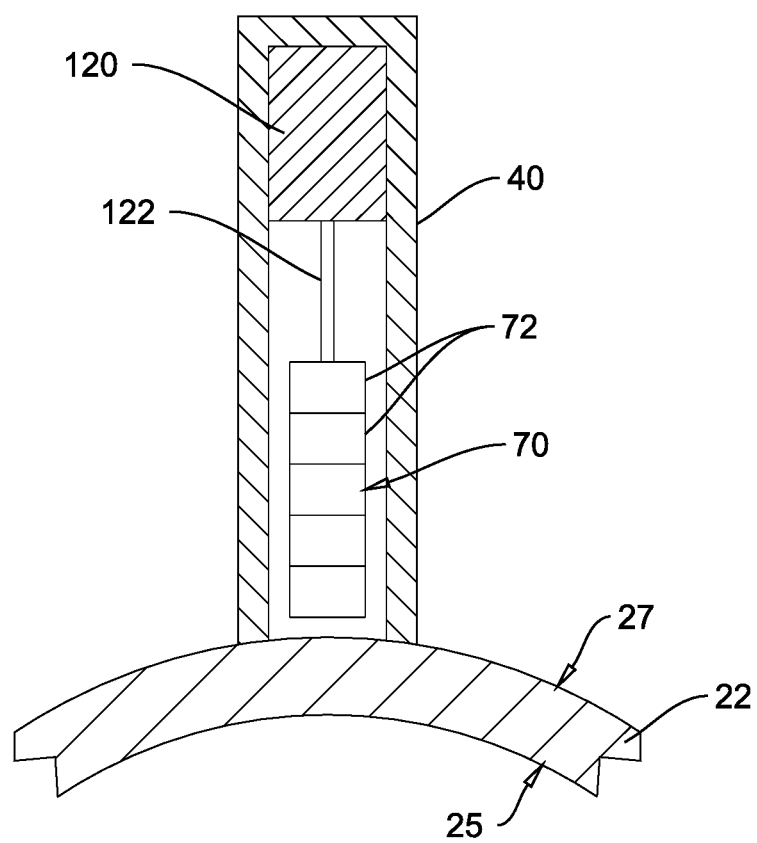
FIG. 9 is a detailed cross sectional view of one of the magnetic stacks of the apparatus of FIG. 3.

Turning now to FIG. 9, a detailed cross sectional view of one of the magnetic stacks 70 is illustrated. As illustrated in FIG. 9, the magnetic stack 70 may be located within a sleeve 40 which also includes an actuator 120 and an actuator shaft 122 extending from the actuator 120 to the magnetic stack 70. In operation, the actuator 120 may extend or retract the magnetic stack 70 into and out of engagement with the outer surface 27 of the tubular body 22. In the retracted position, the magnetic field produced by the magnetic stack 70 will be reduced thereby permitting any ferromagnetic particles attracted thereto to be released from the interior of the central passage.

While specific embodiments of the invention have been described and illustrated, such embodiments should be considered illustrative of the invention only and not as limiting the invention as construed in accordance with the accompanying claims.

What is claimed is:

1. An apparatus for measuring a metallic object within a well structure, the apparatus comprising:

a tubular body extending between first and second ends and having an inner surface defining a passage therethrough and an outer surface, said body being famed of a non-magnetic alloy metal;

a pair of flanges each connected to one of said first or second ends of said tubular body formed of a magnetic alloy metal and having a passage therethrough corresponding to said passage of said tubular body, each of said pair of flanges being connectable inline with said well structure for coupling said apparatus to said well structure at a location above a soil formation;

at least one sensor stack being locatable around an outside of said tubular body comprising a sensor adapted to measure magnetic field strength; and at least one magnetic stack being locatable around said outside of said tubular body comprising at least one magnet.

2. The apparatus of claim 1 wherein said tubular body includes at least one housing each extending around one of said at least one sensor stack or one of said at least one magnetic stack.

3. The apparatus of claim 2 wherein said at least one housing each comprises a sleeve.

4. The apparatus of claim 3 wherein said at least one sensor stack and said at least one magnetic stacks extend radially from said tubular body.

5. The apparatus of claim 1 wherein said sensor stack comprises a sensor for outputting a signal representing the diameter of said metallic object located within said passage.

6. The apparatus of claim 5 wherein said sensor comprises a hall effects sensor.

7. The apparatus of claim 5 wherein said sensor is located at proximate to an outer surface of said tubular body.

8. The apparatus of claim 5 wherein said at least one sensor stack includes a magnet located away from said outer surface of said tubular body.

9. The apparatus of claim 1 wherein said at least one magnet stack comprises at least one magnet.

10. The apparatus of claim 9 wherein said at least one magnet comprises a plurality of magnets.

11. The apparatus of claim 9 wherein said at least one magnet comprises rare earth magnets.

12. The apparatus of claim 9 wherein said at least one magnet comprises electromagnets.

13. The apparatus of claim 9 wherein said at least one sensor stack and said at least one magnetic stack are arranged around said tubular body.

14. The apparatus of claim 13 wherein said at least one sensor stack and said at least one magnetic stack are arranged at regular intervals around said tubular body.

15. The apparatus of claim 13 wherein said at least one sensor stack and said at least one magnetic stack are arranged along a common plane perpendicular to an axis of said tubular body.

16. The apparatus of claim 15 wherein said at least one sensor stack and said at least one magnetic stack are arranged along a plurality of planes.

17. The apparatus of claim 1 wherein said pair of flanges are formed of a magnetic alloy metal.

18. A system for measuring a pipe within a well structure comprising:

a tubular body extending between first and second ends and having an inner surface defining a passage therethrough and an outer surface, said body being formed of a non-magnetic alloy metal;

a pair of flanges each connected to one of said first or second ends of said tubular body, having a passage therethrough corresponding to said passage of said tubular body, each of said pair of flanges being connectable inline with said well structure for coupling said tubular body to said well structure at a location above a soil formation;

at least one sensor stack being locatable around an outside of said tubular body comprising a sensor adapted to measure magnetic field strength;

at least one magnetic stack being locatable around said outside of said tubular body comprising at least one magnet; and a display adapted to receive an output from said at least one sensor stack and provide a display to a user indicating the diameter of an object within said tubular body.

19. The apparatus of claim 1 wherein said at least one sensor stack and said at least one magnetic stack are arranged alternately around said tubular body.

* * * * *